United States Patent [19]

Ona et al.

[11] Patent Number: 5,300,237
[45] Date of Patent: Apr. 5, 1994

[54] FIBER TREATMENT AGENT

[75] Inventors: Isao Ona; Masaru Ozaki, both of Chiba, Japan

[73] Assignee: Dow Corning Toray Silicone Co., Ltd., Tokyo, Japan

[21] Appl. No.: 755,250

[22] Filed: Sep. 5, 1991

[30] Foreign Application Priority Data

Sep. 10, 1990 [JP] Japan .................................. 239377

[51] Int. Cl.$^5$ .......................................... D06M 15/00
[52] U.S. Cl. ..................................... 252/8.6; 252/8.8; 252/8.9; 252/174.15; 525/479; 524/292; 428/266
[58] Field of Search ................... 252/8.6, 8.7, 8.8, 8.9; 525/479; 524/292; 478/266

[56] References Cited

U.S. PATENT DOCUMENTS

| | | | |
|---|---|---|---|
| 4,240,943 | 12/1980 | Sigawara et al. | 252/8.8 |
| 4,247,592 | 1/1981 | Kalinowski | 428/266 |
| 4,301,268 | 11/1981 | Kropac | 525/479 |
| 4,382,111 | 5/1983 | Kawayama et al. | 252/8.6 |
| 4,624,794 | 11/1986 | Cooke | 252/8.8 |
| 4,818,779 | 4/1989 | Witucki et al. | 524/292 |
| 4,833,187 | 5/1989 | Sittenthaler et al. | 525/479 |
| 4,908,228 | 3/1990 | Lo | 525/479 |
| 4,963,438 | 10/1990 | Weitemeyer et al. | 525/479 |
| 4,966,725 | 10/1990 | Singer et al. | 252/8.8 |
| 4,973,620 | 11/1990 | Ona | 524/292 |
| 4,978,363 | 12/1990 | Ona | 8/581 |
| 4,978,561 | 12/1990 | Cray | 427/387 |
| 4,988,779 | 1/1991 | Medford et al. | 525/479 |
| 5,039,761 | 8/1991 | Ono et al. | 525/479 |
| 5,047,065 | 9/1991 | Vogel et al. | 252/8.8 |
| 5,057,572 | 10/1991 | Chrobaczek | 524/588 |
| 5,078,747 | 1/1992 | Kastele | 8/181 |
| 5,115,049 | 5/1992 | Inperante et al. | 525/479 |

FOREIGN PATENT DOCUMENTS

| | | |
|---|---|---|
| 61106614 | 5/1984 | Japan . |
| 8800991 | 2/1988 | PCT Int'l Appl. . |
| 9010028 | 9/1990 | PCT Int'l Appl. . |

*Primary Examiner*—Paul Lieberman
*Assistant Examiner*—Michael P. Tierney
*Attorney, Agent, or Firm*—George A. Grindahl; Richard I. Gearhart

[57] ABSTRACT

The amino groups of an organopolysiloxane are reacted with an acrylic acid or ester compound to provide a fiber-treating composition which is almost completely free of yellowing, while at the same time being characterized by an excellent softness and smoothness.

2 Claims, No Drawings

FIBER TREATMENT AGENT

BACKGROUND OF THE INVENTION

The present invention relates to an organopolysiloxane-based fiber treatment agent which is almost completely devoid of yellowing of the treated fiber.

Fiber treatment agents based on diorganopolysiloxane containing the —CH$_2$CH$_2$CH$_2$NHCH$_2$CH$_2$NH$_2$ group have been used in order to impart lubricity to fibers and fibrous materials. for example, natural fiber such as cotton, flax, silk, wool, Angora, and mohair; regenerated fiber such as rayon and bemberg; semisynthetic fiber such as acetate; and synthetic fiber such as polyester, polyamide, polyacrylonitrile, polyvinyl chloride, vinylon, polyethylene, polypropylene, and spandex. Refer to Japanese Patent Publication Number 57-43673 (43,673/82). However, due to spontaneous oxidation, fiber treated with diorganopolysiloxane containing the —CH$_2$CH$_2$CH$_2$NHCH$_2$CH$_2$NH$_2$ group yellows with the passage of time.

BRIEF SUMMARY OF THE INVENTION

The present invention takes as its object a solution to the aforementioned problem through the introduction of a fiber treatment agent which is capable of imparting an excellent softness and smoothness to the recipient fiber without causing yellowing. The aforesaid object is accomplished by a fiber treatment agent which is an addition reaction product between (A) an organopolysiloxane which is liquid at room temperature, which is essentially linear, and which contains in each molecule at least one group as represented by —R$^1$(NHCH$_2$CH$_2$)$_a$NH$_2$ wherein R$^1$ is a divalent hydrocarbon group and a is an integer with a value of zero to 10 and (B) an acrylic acid compound or acrylate ester compound as represented by $$\begin{array}{c} R^2 \\ | \\ CH_2=C-COOR^3 \end{array}$$

wherein R$^2$ is the hydrogen atom or the methyl group and R$^3$ is the hydrogen atom, a monovalent hydrocarbon group, the group represented by $$\begin{array}{c} R^4{}_b \\ | \\ -R^1-Si(OR^5)_{3-b} \end{array}$$

wherein R$^1$ has the same definition as above, R$^4$ is a monovalent hydrocarbon group, b has a value of zero, 1, or 2, and R$^5$ is a monovalent hydrocarbon group, or the group represented by $$\begin{array}{c} R^6 \\ | \\ -(CH_2CHO)_nR^7 \end{array}$$

wherein R$^6$ is the hydrogen atom or the methyl group, n is an integer with a value of 1 to 50. and R$^7$ is the hydrogen atom or a monovalent hydrocarbon group; wherein said addition reaction is carried out using 0.2 to 1.3 moles component (B) per 1 mole of the total quantity of amino groups in component (A).

DETAILED DESCRIPTION OF THE INVENTION

To explain the preceding in greater detail, component (A) comprises an organopolysiloxane which is liquid at room temperature, which is essentially linear, and which contains in each molecule at least 1 group —R$^1$(NHCH$_2$CH$_2$)$_a$NH$_2$ wherein R$^1$ is a divalent hydrocarbon group and a is an integer with a value of zero to 10.

Essentially linear denotes a molecular structure which is either strictly linear or is a moderately branched straight chain. The requirement for liquidity at room temperature excludes gums, and the viscosity at 25 degrees Centigrade should not exceed approximately 300,000 centistokes.

At least 1 group —R$^1$(NHCH$_2$CH$_2$)$_a$NH$_2$ must be present in each molecule. This group may be present only as a side chain, or only at the molecular chain terminal(s), or both as a side chain and at the molecular chain terminal(s).

This group —R$^1$(NHCH$_2$CH$_2$)$_a$NH$_2$ is concretely exemplified by —CH$_2$CH$_2$NH$_2$, —CH$_2$CH$_2$CH$_2$NH$_2$, —CH$_2$CH(CH$_3$)CH$_2$NH$_2$, —(para-C$_6$H$_4$)—NH$_2$, —(CH$_2$)$_3$NHCH$_2$CH$_2$NH$_2$, and —(CH$_2$)$_3$—(NHCH$_2$CH$_2$)$_2$NH$_2$.

Component (A) in which no more than one group —R$^1$(NHCH$_2$CH$_2$)$_a$NH$_2$ is bonded on any single silicon atom can be prepared in simple, well-known methods. The presence in the molecule of the diorganosiloxane unit free of this group, for example, the methylalkylsiloxane unit and particularly the dimethylsiloxane unit, is preferred from the standpoints of softness and smoothness.

A typical example of component (A) is organopolysiloxane which contains in each molecule at least one group —R$^1$(NHCH$_2$CH$_2$)$_a$NH$_2$ and which has the following general formula $$AR_2SiO(R_2SiO)_p(RSiO)_qSiR_2A$$
$$|$$
$$R^1(NHCH_2CH_2)_aNH_2$$

wherein R is a monovalent hydrocarbon group. A is a group R or a group —R$^1$(NHCH$_2$CH$_2$)$_a$NH$_2$, R$^1$ is a divalent hydrocarbon group, a is an integer with a value of zero to 10. p and q are each integers with values of zero or one or more, and p+q is an integer with a value of 10 to 2,000.

The group R in the preceding formula is a monovalent hydrocarbon group, and it is exemplified by alkyl groups such as methyl, ethyl, propyl, and butyl; aralkyl groups such as 2-phenylethyl and 2-phenylpropyl; halogen-substituted alkyl groups such as 3,3,3-trifluoropropyl; alkenyl groups such as vinyl, propenyl, and butadienyl; cycloalkyl groups such as cyclohexyl; aryl groups such as phenyl and naphthyl; and alkaryl groups such as tolyl and xylyl. Alkyl, then alkenyl and aryl, are preferred, and methyl is particularly preferred. The group R within the single molecule may comprise a single species or different species. It is preferred that methyl comprise at least 50 mole % of the groups R in the individual molecule.

The group R$^1$ is a divalent hydrocarbon group, and examples here are alkylene groups such as methylene, ethylene, n-propylene, isopropylene, n-butylene, and isobutylene; arylene groups such as phenylene; and alkylenearylene groups such as ethylenephenylene.

Among these, alkylene is generally employed. The subscript a is an integer with a value of zero to 10, but values of 0 to 2 are preferred from the standpoint of ease of synthesis. Moreover, p and g are each integers with values of zero or 1 or more. The group A is a group R or the group —R$^1$(NHCH$_2$CH$_2$)$_a$NH$_2$. The subscript q may be zero when one of the groups A is the group —R$^1$(NHCH$_2$CH$_2$)$_a$NH$_2$. The value of p +g must be an integer with a value of 10 to 2,000. At values below 10, there is little effect in terms of imparting softness and smoothness to the fiber. Emulsification is made difficult by values in excess of 2,000.

With regard to the structure of component (A), the diorganopolysiloxane moiety functions to develop softness and smoothness, and the amino group moiety undergoes an addition reaction with component (B).

Component (B) is an acrylic acid compound or acrylate ester compound as represented by

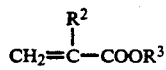

wherein R$^2$ is the hydrogen atom or the methyl group, and R$^3$ is the hydrogen atom, a monovalent hydrocarbon group, the group represented by

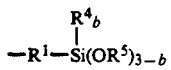

wherein R$^4$ is a monovalent hydrocarbon group, R$^5$ is a monovalent hydrocarbon group, and b has a value of zero, 1, or 2, or the group represented by

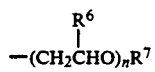

wherein R$^6$ is the hydrogen atom or the methyl group, n is an integer with a value of 1 to 50, and R$^7$ is the hydrogen atom or a monovalent hydrocarbon group.

This component is concretely exemplified by acrylic acid and methacrylic acid and their esters. The methacrylate esters are exemplified by methyl methacrylate, ethyl methacrylate, propyl methacrylate, butyl methacrylate, hexyl methacrylate, 2-ethylhexyl methacrylate, lauryl methacrylate, stearyl methacrylate, and 3-hydroxypropyl methacrylate. The acrylate esters are exemplified by compounds corresponding to the concrete examples of the methacrylate esters. When such a component (B) is deployed, its unsaturated group addition reacts with the amino group in component (A) to cause a substantial reduction in the yellowing identified above as the problem.

Compounds with the structure

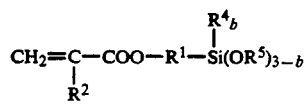

are concretely exemplified by

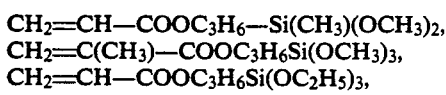

CH$_2$=CH—COOC$_3$H$_6$Si(OC$_2$H$_5$)$_3$,
CH$_2$=C(CH$_3$)—COOC$_3$H$_6$Si(CH$_3$)(OC$_2$H$_5$)$_2$, and
CH$_2$=C(CH$_3$)—COOC$_3$H$_6$Si(C$_2$H$_5$)(OC$_2$H$_5$)$_2$.

When this type of component (B) is used, its unsaturated group addition reacts with the amino group in component (A) again to cause a substantial reduction in the yellowing. But in addition, intermolecular crosslinking through the alkoxy group creates the additional advantage of an improvement in the laundering resistance.

Compounds with the structure

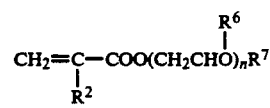

are concretely exemplified by

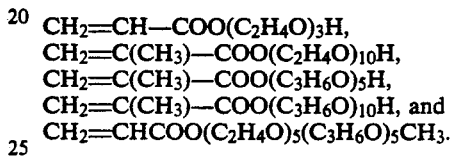
CH$_2$=C(CH$_3$)—COO(C$_2$H$_4$O)$_{10}$H,
CH$_2$=C(CH$_3$)—COO(C$_3$H$_6$O)$_5$H,
CH$_2$=C(CH$_3$)—COO(C$_3$H$_6$O)$_{10}$H, and
CH$_2$=CHCOO(C$_2$H$_4$O)$_5$(C$_3$H$_6$O)$_5$CH$_3$.

When this type of component (B) is employed, its unsaturated group addition reacts with the amino group in component (A) again to cause a substantial reduction in the yellowing. But in addition, due to the presence within the molecule of the hydrophilic polyoxyalkylene group, other distinctive effects are imparted, such as water absorptivity, perspiration absorptivity, and antistaticity. Emulsification is also facilitated and emulsion stability is improved.

The proportion of component (B) relative to component (A) should be 0.2 to 1.3 moles per mole total quantity of amino groups in component (A), and the amino group quantity under consideration includes both the primary and secondary amino groups. The suppression of yellowing will be inadequate at less than 0.2 moles, while the handle deteriorates at more than 1.3 moles. Thus the required range is 0.2 to 1.3.

When components (A) and (B) are first mixed at the above-described ratio and then heated under nitrogen for 2 to 3 hours at 100 to 110 degrees Centigrade, the addition reaction proceeds readily to afford an advantageous reaction product. The reaction equation is, for example,

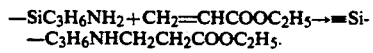
—C$_3$H$_6$NHCH$_2$CH$_2$COOC$_2$H$_5$.

The fiber treatment agent according to the present invention may be directly applied to the fiber, or it may be dissolved in organic solvent (e.g. toluene, xylene, benzene, n-hexane, heptane, acetone, methyl ethyl ketone, methyl isobutyl ketone, ethyl acetate, butyl acetate, mineral spirits, perchloroethylene, trichloroethylene, etc.) for application to the fiber, or it may first be emulsified using an emulsifying agent and then applied to the fiber.

Cationic and nonionic surfactants are preferably used as this emulsifying agent.

The cationic surfactants are exemplified by the quaternary ammonium hydroxides such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, beef tallow trimethylammonium hydroxide, and cocotrimethylammonium hydroxide; and by their salts.

The nonionic surfactants are exemplified by polyoxyalkylene alkyl ethers, polyoxyalkylene alkylphenol ethers, polyoxyalkylene alkyl esters, polyoxyalkylene sorbitan alkyl esters, polyethylene glycols, polypropylene glycols, and diethylene glycol.

The surfactant should be used preferably at 5 to 50 weight parts and more preferably at 10 to 30 weight parts, in each case per 100 weight parts organopolysiloxane comprising component (A).

While the quantity of water used is freely selectable, it is generally employed so as to give an organopolysiloxane concentration of 5 to 60 weight % and more preferably of 10 to 40 weight %.

The fiber treatment agent according to the invention can be emulsified by first adding surfactant as above and a small quantity of water to the addition-reaction product from components (A) and (B) with mixing to homogeneity, and by then converting this into the emulsion using an emulsifying device such as an homogenizer, colloid mill, line mixer, propeller mixer, or vacuum emulsifier.

The fiber treatment agent according to the present invention may contain other additives as known to the art, such as dyes, antistatics, softeners, creaseproofing agents, thermal stabilizers, flame retardants, and so forth.

The fiber can be treated using such methods as spray, roll application, brushing, immersion, and so forth. The add-on cannot be rigorously specified because it will vary with the fiber under consideration, but a general range is 0.01 to 10.0 weight % as organopolysiloxane fraction referred to the fiber. The fiber is then treated by standing at ambient temperature, exposure to a hot air current, heat treatment, and so forth.

The fiber itself may consist of natural fiber such as wool, silk, flax, cotton, Angora, mohair, and asbestos; regenerated fiber such as rayon and bemberg; semisynthetic fiber such as acetate; synthetic fiber such as polyester, polyamide, polyacrylonitrile, polyvinyl chloride, vinylon, polyethylene, polypropylene, and spandex; and inorganic fiber such as glass fiber, carbon fiber, and silicon carbide fiber. It may take the form of the staple, filament, tow, top, or yarn, and it may have been converted into the knit, weave, nonwoven, resin-finished fabric, or artificial leather.

The present invention is explained below in greater detail, but not limited, through illustrative examples. Unless stated otherwise, parts=weight parts, %=weight %, and the viscosity is the value at 25 degrees Centigrade.

EXAMPLE 1

Ethyl acrylate and an amino-containing organopolysiloxane (siloxane A) with a viscosity of 1050 centistokes and with the following formula $$(CH_3)_3SiO\{(CH_3)_2SiO\}_{400}(CH_3SiO)_8Si(CH_3)_3$$
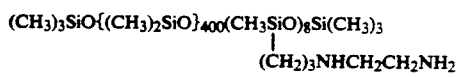

were introduced into a four-neck flask in the quantities reported in Table 1. After sealing with nitrogen, an addition reaction was run to completion by maintenance for 3 hours at 95° C +/−5° C. Treatment baths (a) through (f) were prepared by dilution with toluene in the quantity reported in Table 1.

TABLE 1

| | Treatment Baths | | | | | |
|---|---|---|---|---|---|---|
| | Comp. Exam. | Present Invention | | Comparison Examples | | |
| Components | (a) | (b) | (c) | (d) | (e) | (f) |
| Siloxane A | 9.20 | 9.20 | 9.20 | 9.20 | 9.20 | 0 |
| Ethyl acrylate | 0.71 | 0.47 | 0.24 | 0.05 | 0 | 0 |
| Toluene | 990.09 | 990.33 | 990.56 | 990.75 | 990.80 | 1000.0 |
| Molar ratio between ethyl acrylate and amino groups in siloxane A | 1.5 | 1.0 | 0.5 | 0.1 | 0 | — |

A fluorescent-whitened 100% cotton knit (50 cm×50 cm) was immersed for 10 seconds in the particular treatment bath, then removed, wrung out to an expression ratio of 100% on a squeeze roller, spread out at room temperature and dried (0.9% siloxane A add-on to the knit). The fabric was then heat treated for 3 minutes in a hot-air dryer at 130 degrees Centigrade and removed. It was then cut in half along the center. One piece was used for an evaluation of the handle by manual manipulation. Four 10 cm×10 cm samples were cut from the other piece. These were heat treated for 5 minutes in an oven at 180 degrees Centigrade and then removed. The four pieces of knit fabric were then stacked and the degree of yellowing DYI was calculated using an SM Color Computer from Suga Shikenki Kabushiki Kaisha. Color measurements of the tristimulus values XYZ were performed using the SM Color Computer, and DYI was calculated using the following equations.

$$YI = \frac{100(1.28X - 1.06Z)}{Y}$$

$$DYI = YI_2 - YI_1$$

where $YI_1$=degree of yellowing for the blank
$YI_2$=degree of yellowing for the sample As reported in Table 2, fabric treated with a treatment bath according to the present invention ((b) and (c)) had an excellent handle and also a very small degree of yellowing.

TABLE 2

| Treatment Bath | | Handle | Degree of yellowing (DYI) |
|---|---|---|---|
| Present invention | (b) | Excellent handle. Good elongation/recovery, resistant to wrinkling. Excellent as underwear. | 1.65 |
| | (c) | Excellent handle. Good elongation/recovery, resistant to wrinkling. Excellent as underwear | 1.78 |
| Comparison examples | (a) | Does not slide well; smoothness also reduced. Unsuitable as underwear. | 1.63 |
| | (d) | Excellent handle. | 5.22 |
| | (e) | Excellent handle. | 6.44 |
| | (f) | Coarse and hard, poor elongation/recovery. Easily wrinkled. | — |

EXAMPLE 2

92 Parts amino-containing organopolysiloxane (siloxane B) with a viscosity of 1100 centistokes and with the following formula

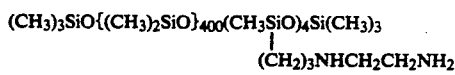

and 5.65 parts gamma-acryloxypropyltrimethoxysilane (molar ratio between the silane and the total quantity of amino groups in siloxane B=1.0) were introduced into a four-neck flask. A nitrogen seal was set up and an addition reaction was run by maintenance for 2 hours at 100° C +/−5° C. Another addition reaction was similarly run using 92 parts siloxane B and 6.28 parts gamma-methacryloxypropylmethyldiethoxysilane (molar ratio between the silane and the total quantity of amino groups in siloxane B=1.0). Ten parts of each addition-reaction product was dissolved in 990 parts toluene in order to prepare treatment baths (g) and (h). respectively. Two pieces of fluorescent-whitened 100% cotton knit fabric (50 cm×50 cm) were treated as described in Example 1 with the particular treatment bath, and the degree of yellowing was measured as in Example 1. Using the remaining treated fabric, the residual addition-reaction product (%) after 5 water-based launderings was measured. Also measured (wale direction) were the flexural rigidity, crease resistance (%), elongation (%), and elongation recovery (%) according to JIS L-1018 (Test Methods for Knit Fabrics).

The water-based laundering conditions were as follows; 1 laundry cycle consisted of one wash at 40 degrees Centigrade for 15 minutes in a 0.5% aqueous solution of Zabu (weakly alkaline detergent from Kao Kabushiki Kaisha, bath ratio=1:50) followed by two water rinses under the same conditions but with omission of the detergent. The laundry cycle was repeated 5 times and the fabric was then hung up and dried at room temperature.

The residual addition-reaction product was measured as follows.

The number of counts for the silicon in the addition-reaction product bonded to the fabric was measured before and after laundering using a fluorescent X-ray analyzer from Rigaku Denki Kogyo Kabushiki Kaisha. The post-laundry value was divided by the pre-laundry value and the result was multiplied by 100.

For comparison, the same tests were carried out using a treatment bath (i) which was prepared by dissolving 10 parts siloxane B in 990 parts toluene.

As reported in Table 3, the fabrics treated with the treatment baths according to the present invention suffered from very little yellowing and presented large values for the residual addition-reaction product (=excellent laundering resistance). Moreover, they had a small flexural rigidity, that is, were soft, and also had large values for the crease resistance, elongation, and elongation recovery.

TABLE 3

| Properties | Present Invention (g) | Present Invention (h) | Comparison Example (i) |
|---|---|---|---|
| Degree of yellowing (DYI) | 0.75 | 0.81 | 5.35 |
| Residual addition-reaction product (%) | 91 | 88 | 73 |
| Flexural rigidity (mm) | 31 | 31 | 35 |
| Crease resistance (%) | 87 | 86 | 78 |
| Elongation (%) | 48 | 46 | 44 |
| Elongation recovery (%) | 87 | 85 | 76 |
| Global evaluation as knit underwear (white goods) | excellent | excellent | poor |

EXAMPLE 3

92 Parts organopolysiloxane (siloxane C) with a viscosity of 1,220 centistokes and with the formula

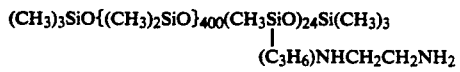

and 65.5 parts methoxypolyethylene glycol methacrylate with the formula $CH_2=C(CH_3)COO(C_2H_4O)_{10}CH_3$ (ratio between the methacrylate and total quantity of amino groups in siloxane C =1.0) were introduced into a four-neck flask. A nitrogen seal was set up, and an addition reaction was then run by maintenance for 3 hours at 85° C +/−5° C. A treatment bath (j) was prepared by dissolving 10 parts of the addition-reaction product (oil) in 990 parts toluene. Using the same type of fabric as in Example 1, treatment was carried out as in Example 1, and the degree of yellowing was also evaluated as in Example 1. A piece was then cut from the fabric and laid out flat on filter paper. One drop of water was placed on it using a syringe, and the time (seconds) was recorded for the water droplet to spread out and disappear. For comparison, a treatment bath (k) was prepared by dissolving 10 parts siloxane C in 990 parts toluene followed by treatment, evaluation of the degree of yellowing, and evaluation of the water absorptivity as above.

As reported in Table 4, the knit fabric treated with the treatment bath according to the present invention had a remarkably small degree of yellowing, and was thus rated as excellent in this regard. Moreover, due to the presence of hydrophilic groups in the molecule, the water absorptivity was also excellent, which is indicative of a highly perspiration-absorptive fiber treatment agent.

TABLE 4

| Properties | Present invention | Comparison example |
|---|---|---|
| Degree of yellowing (DYI) | 1.07 | 6.98 |
| Water absorptivity (seconds) | 0.2 | ≧1.200 |

EXAMPLE 4

1.0 Part polyoxyethylene (EO; 6 moles) lauryl ether, 2.0 parts polyoxyethylene (EO: 8 moles) lauryl ether, 0.25 parts acetic acid, and 81.75 parts water were added to 15 parts addition-reaction product from Example 1, and a homogeneous emulsion was prepared by stirring with a stirrer. 1,400 Parts water was then added to 100 parts of this emulsion to prepare a treatment bath (1). The handle and degree of yellowing were measured as in Example 1.

For comparison, a treatment bath (m) was also prepared by similarly emulsifying the siloxane A from Example 1. The handle and degree of yellowing were measured as above.

As reported in Table 5, the fabric treated with treatment bath (1) according to the present invention had an excellent handle and low degree of yellowing and was excellent as a treatment agent for underwear.

TABLE 5

| Treatment Bath | | Handle | Degree of yellowing (DYI) |
|---|---|---|---|
| Present invention | (l) | Excellent handle. Good elongation recovery, resistant to wrinkling. Excellent as underwear. | 1.45 |
| Comparison example | (m) | Excellent handle. | 6.05 |

EFFECTS OF THE INVENTION

Because the amino groups in the organopolysiloxane of the fiber treatment agent according to the present invention undergo an addition reaction with the acrylic group in the acrylic acid-type compound or acrylate ester-type compound, the treated fiber is characteristically subject to almost no yellowing while at the same time being characterized by an excellent softness and smoothness.

That which is claimed is:

1. A fiber treatment agent composition which is an addition reaction product consisting essentially of:
   (A) an organopolysiloxane which is liquid at room temperature, which is essentially linear, and which has the following general formula

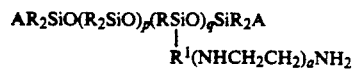

wherein R is a monovalent hydrocarbon group, A is a group R or a group $-R^1(NHCH_2CH_2)_aNH_2$, $R^1$ is a divalent hydrocarbon group, a is an integer with a value of zero to 10, p is an integer with a value of zero or more, g is an integer with a value of one or more, and p±q is an integer with a value of 10 to 2,000, and (B) an acrylic acid compound or acrylate ester compound as represented by

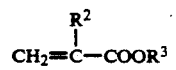

wherein $R^2$ is the hydrogen atom or the methyl group, and $R^3$ is the hydrogen atom, a monovalent hydrocarbon group, the group represented by

wherein $R^1$ has the same definition as above, $R^4$ is a monovalent hydrocarbon group, b has a value of zero, 1, or 2, and $R^5$ is a monovalent hydrocarbon group, or the group represented by

wherein $R^6$ is the hydrogen atom or the methyl group, n is an integer with a value of 1 to 50, and $R^7$ is the hydrogen atom or a monovalent hydrocarbon group; wherein said addition reaction is carried out using 0.2 to 1.3 moles component (B) per 1 mole of the total quantity of amino groups in component (A).

2. The fiber treatment agent composition according to claim 1 in which R is methyl and the subscript a has a value of 1.

* * * * *